May 19, 1953 W. P. GREEN 2,639,116
VALVE STRUCTURE
Filed April 26, 1949 2 Sheets-Sheet 1

William P. Green
INVENTOR

May 19, 1953  W. P. GREEN  2,639,116
VALVE STRUCTURE
Filed April 26, 1949  2 Sheets-Sheet 2
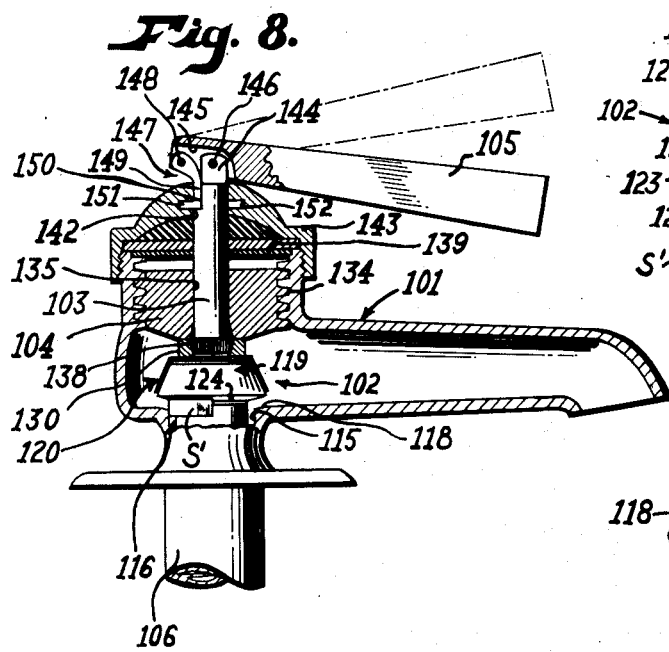
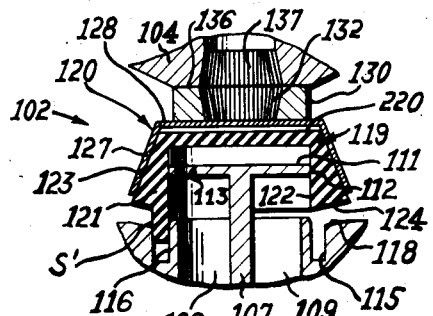
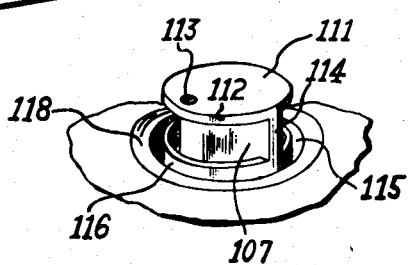
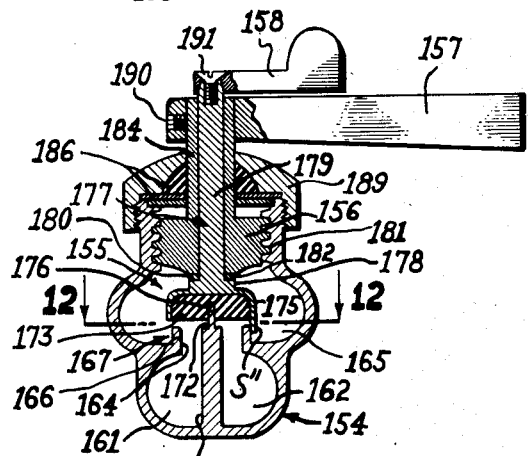
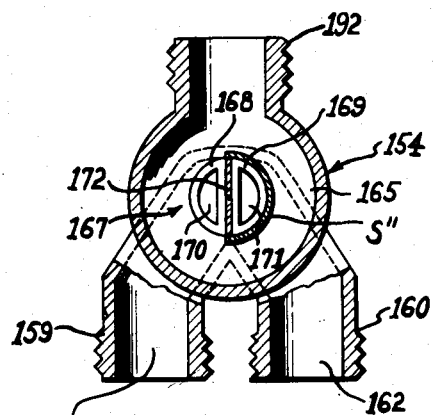
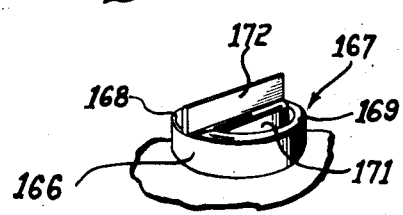
William P. Green
INVENTOR.

Patented May 19, 1953

2,639,116

UNITED STATES PATENT OFFICE 2,639,116

VALVE STRUCTURE

William P. Green, Los Angeles, Calif.

Application April 26, 1949, Serial No. 89,765

26 Claims. (Cl. 251—4)

This invention relates generally to improved valves, and concerns particularly novel devices in which a single valve assembly is operable to control the relative rates of fluid flow between two associated passages and a common chamber or space. Though the present invention is applicable, in its broad aspects, to various situations in which it is desirable to control the proportion of a total rate of flow passing through each of a pair of fluid conducting passages, valves embodying the invention are especially adapted for use as hot and cold water mixing valves and will be described as applied to that use.

In almost any situation where hot and cold water are used together, as in shower bath installations, bath tubs, sinks, and basins, it would of course be highly desirable to use a single mixing valve operable to discharge a combined stream of independently controllable volume and temperature. However, though many types of mixing valves have heretofore been proposed, none has proven sufficiently effective and practical for adoption on the extremely wide scale obviously possible. In the first place, most mixing valves act only to control the water discharge temperature and are not adapted to independently vary the total rate of discharge at a given temperature. Such devices are, of course, entirely unsatisfactory for most purposes, and give far less effective control than would be desired in the situations where they have seen some use, as in shower installations.

Some relatively few mixing devices heretofore proposed have been operable to independently control both the temperature and rate of water discharge, but each of these with which I am acquainted has proven either inadequate in some respect or far too complicated and expensive to successfully complete with the conventional faucet or valve. Consequently, the only type of mixing device being employed in any large percentage of household and other installations today is the conventional double unit arrangement in which a pair of entirely independent valves are housed in a common body to discharge together through a single spout or outlet.

An important object of the present invention is therefore to provide a simple and effective hot and cold water mixing valve operable to independently control both the temperature and rate of water discharge, and having such structural and functional characteristics as to be completely satisfactory for virtually all water mixing purposes. As will appear, devices embodying the invention are particularly characterized by a structural simplicity corresponding more closely to that of a conventional single flow valve than to any of the previously devised mixing units.

To overcome a major weakness of prior devices, a specific object of the invention is to provide a mixing valve of the above simplicity which is adapted, in its closed position, to form a positive seal against water leakage or interflow between the hot and cold water inlet passages. A closely related feature involves the provision of a seal preventing the leakage or discharge of water from the spout or outlet line with the valve closed. In certain preferred forms of the invention, both of the above seals are formed simultaneously by movement of a single flow-controlling valve element into globe valve or compression valve type seating engagement with a pair of valve seat surfaces. Previous mixing devices, on the other hand, have generally provided a relatively ineffective slide valve closure between the inlets, and have usually required a valve element in addition to the flow controlling assembly to form a seal against water discharge from the outlets.

The above and further features and objects of the present invention will be better understood from the following detailed description of the typical embodiments illustrated in the accompanying drawings, in which:

Fig. 8 is a vertical section through a variational form of mixing faucet;

Fig. 9 is an enlarged fragmentary vertical section through the valve assembly and valve seat structure of Fig. 8;

Fig. 10 is an enlarged fragmentary perspective view showing the valve seat structure of the form illustrated in Fig. 8;

Fig. 11 is a sectional view of a further variational form of mixing valve embodying the invention and especially adapted for controlling water discharge from a shower head;

Fig. 12 is a transverse section taken on line 12—12 of Fig. 11; and

Fig. 13 is an enlarged fragmentary perspective view of the valve seat structure shown in Figs. 11 and 12.

Figure 1:
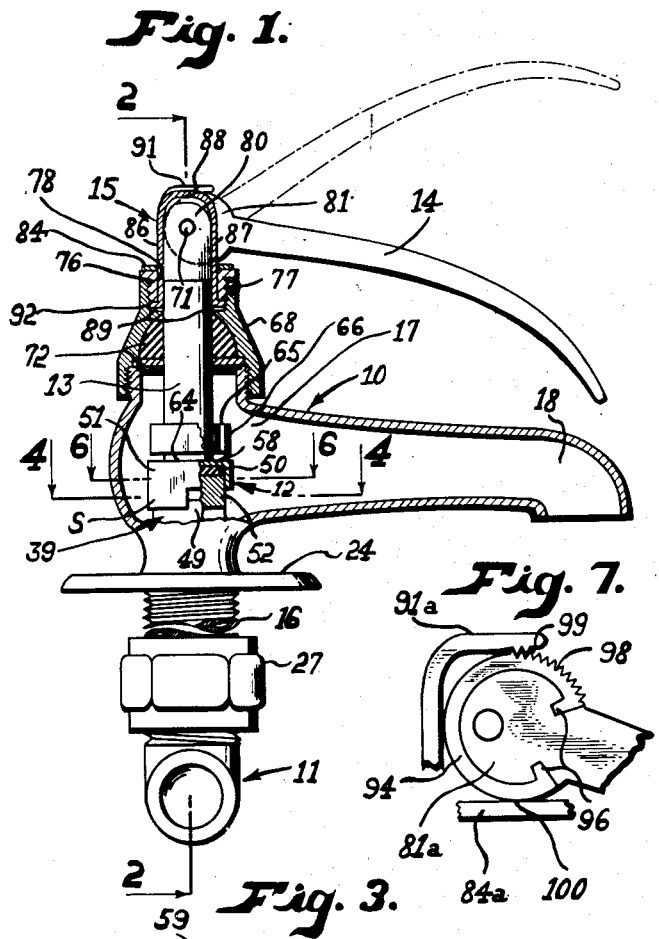
Fig. 1 is a vertical section through a hot and cold water mixing valve or faucet embodying the invention.

Referring first to Figs. 1 through 6, the form of hot and cold water mixing valve there illustrated comprises essentially a body 10 of a design corresponding generally to the conventional basin faucet, inlet fitting 11, movable valve assembly 12 adapted to regulate both hot and cold water discharge from the body, valve stem 13, handle 14, and leaf spring 15 which cooperates with the handle to maintain the valve in any desired vertical position.

Body 10 has a depending tubular inlet portion or tail pipe 16 directing water upwardly from the inlet connection past valve assembly 12 and into main body chamber 17, from which the water is discharged through spout 18. Internally, pipe 16 has an essentially cylindrical bore 19, which may converge slightly near its upper end as illustrated, and which contains diametrical vertically extending partition 21 dividing the pipe interiorly into a pair of inlet passages 22 and 23. Externally, the tail pipe carries the usual transverse mounting flange 24 near its upper end, and is threadedly engageable at its lower end with nut 27 at 25.

T-shaped inlet fitting 11 contains a pair of laterally extending passages 30 and 31 adapted to be placed in communication in any suitable manner with a pair of hot and cold water supply lines (not shown). These passages, separated at their inner ends by vertical diametrical partition 32, extend upwardly within the vertical branch of the inlet fitting to communicate with body passages 22 and 23 in the tail pipe. At its upper end, the inlet fitting threadedly engages the lower portion of nut 27 at 35, the threads of this connection advancing reversely of those at the upper end of the nut to permit tightening of the body and inlet fitting together in turnbuckle fashion by rotation of the nut. Gasket 36 forms a seal between the body and inlet fitting when thus secured together.

Figure 3:
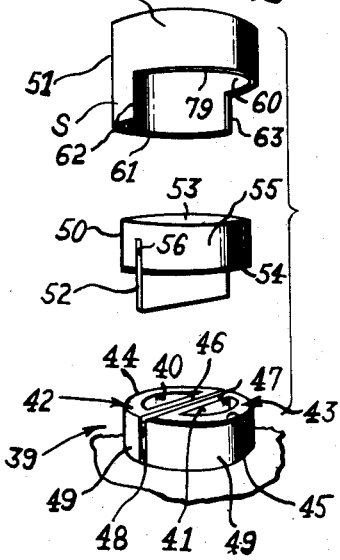
Fig. 3 is an enlarged exploded perspective view of the valve assembly and valve seat structure.
Figure 4:
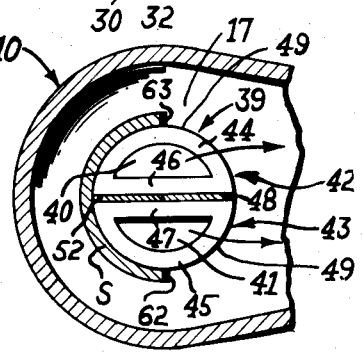
Fig. 4 is an enlarged fragmentary transverse or horizontal section, taken on line 4—4 of Fig. 1.

Extending upwardly within chamber 17, body 10 forms a cylindrical valve seat structure generally indicated at 39 and constituting, in effect, an upper continuation of tail pipe 16 and partition 21. Passages 22 and 23 extend upwardly through the valve seat structure to form at its upper end a pair of substantially semi-circular openings 40 and 41 through which water flows from the passages into chamber 17. The upper surface of the valve seat structure forms a pair of horizontal D-shaped valve seats 42 and 43 immediately adjacent and extending entirely about openings 40 and 41, respectively. As best seen in Figs. 3 and 4, these seats include substantially semi-circular outer valve seat surfaces 44 and 45, respectively, and straight inner surfaces 46 and 47. Diametrical recess or slot 48 extends vertically downwardly within the valve seat structure between valve seat surfaces 46 and 47. At its side, the valve seat structure has a pair of substantially semi-cylindrical vertical surfaces 49 forming together a substantially continuous cylindrical outer surface broken only by recess 48.

Valve assembly 12, which controls the discharge of water through openings 40 and 41 of the valve seat structure into chamber 17, includes, as best seen in Fig. 3, an inner valve element or disc 50, an outer element 51, and a vertical separator or baffle 52. Element 50, which I preferably form of hard rubber or other slightly deformable material but may be of any other suitable material, presents a pair of horizontal upper and lower surfaces 53 and 54, respectively, and a vertical cylindrical side surface 55 aligned with and of a diameter corresponding to faces 49 of the valve seat structure. This element is movable vertically toward and away from seats 42 and 43 to control the total rate of water discharge from passages 22 and 23 into chamber 17, and, in the closed position of the valve assembly, simultaneously engages these seats in globe or compression valve type seating engagement to positively seal against water flow through either of the two openings 40 and 41. Consequently, when the valve is closed, water is positively prevented from either discharging into chamber 17 or flowing between the two inlet passages.

Diametrically extending rectangular baffle 52 is carried by element 50, as by reception of its upper end in vertical groove 56 at the under side of the element. That portion of the baffle projecting downwardly beyond the bottom of element 50 is of a length corresponding to the length of recess 48 and of a width and height slightly less than the corresponding dimensions of the recess to permit its sliding reception within the recess.

Temperature controlling or flow proportioning element 51 of the valve assembly has a horizontal upper wall 58 and a vertically extending cylindrical side wall 59, forming together a recess 60 of dimensions corresponding substantially to the external dimensions of inner element 50 and within which that element is rotatably received. Through half of its circular extent, side wall 59 terminates downwardly in a horizontal edge 79 transversely aligned with the bottom seat engaging surface 54 of element 50. The other half of side wall 59 extends downwardly beyond edge 79 substantially the same distance as baffle 52, to form a depending semi-cylindrical skirt S acting to block water discharge outwardly along half the circular extent of the valve seat structure. Skirt S terminates downwardly in horizontal edge 61 and at its sides in diametrically opposed vertical side edges 62 and 63.

Figure 2:
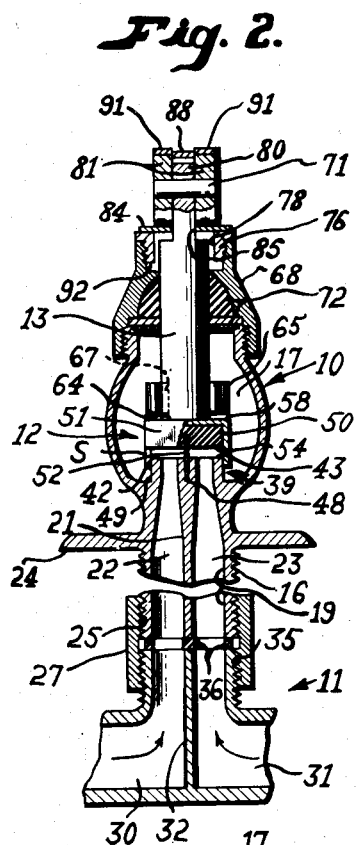
Fig. 2 is a second vertical section through the faucet and taken on line 2—2 of Fig. 1.

Valve assembly 12 is movable relative to the valve seat structure by axial and rotational movement of vertically extending valve stem 13. Though the valve stem, in the simplest form of the faucet, will ordinarily be formed integrally with element 51 to directly control the element, I have illustrated the two as separately formed with engaging horizontal surfaces at 64, being interconnected by a thermostatic unit typically represented as a bi-metallic spiral 65. As seen in Figs. 1 and 2, the thermostatic unit extends horizontally about the lower end of stem 13, being secured at one end to element 51 by upstanding pin 66, and, at the other end, to the stem by reception within radial slot 67. As will be understood, unit 65 controls the angular relationship between stem 13 and element 51 in response to changes in the temperature of the water being discharged from the faucet to maintain a relatively constant discharge temperature for any particular valve setting.

Above chamber 17, body 10 carries an upwardly projecting cap 68 containing the usual sealing elements 72, through which stem 13 extends upwardly for connection with handle 14. Engagement of the stem with the sealing elements and the cap serves to guide the stem for axial and rotational movement. At its upper end, the cap threadedly carries tubular insert 76, which is adapted to be rigidly retained in any desired position relative to the cap by set screw 77. The insert has an internal bore 78 of a diameter greater than the external diameter of stem 13 by an amount equal to approximately twice the thickness of leaf spring 15.

The upper end of the stem is cut away at each side to form a relatively narrow vertically extending straight sided portion 80. Handle 14 is bifurcated at its inner end to present a pair of cylindrical laterally spaced arms 81, engaging opposite sides of upper stem portion 80. The handle is pivotally connected to the upper end of the stem by horizontal pin 71, which extends through arms 81 of the handle at eccentric locations. Bearing washer 84, having central elongated slot 85 of a size slightly greater than that of upper stem portion 80, is received about that stem portion between insert 76 and arms 81 of the handle.

Figure 5:
Fig. 5 is a perspective view of the valve spring.
Figure 6:
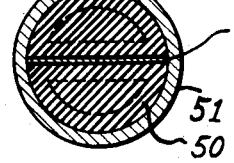
Fig. 6 is an enlarged transverse or horizontal section through the valve assembly taken on line 6—6 of Fig. 1.

Leaf spring 15 is essentially of an inverted U-shape, as illustrated in Figs. 1 and 5, having a pair of downwardly extending legs 86 and 87 interconnected at their upper ends by horizontally extending portion 88. Each of the legs has an outwardly extending perpendicularly disposed flange 89 at its lower end. The legs and horizontal portion 88 are of a width approximately equal to that of the reduced end portion 80 of the valve stem for reception between arms 81 of the handle. Leg 86 has a widened portion 90 near its upper end terminating in a pair of curved spring fingers 91 disposed at opposite sides of horizontal portion 88.

As seen in Fig. 1, spring 15 is received about the upper end of stem 13, with flanges 89 engaging the horizontal annular bottom surface 92 of insert 76. Legs 86 and 87 engage opposite sides of the stem, and horizontal portion 88 of the spring is spaced sufficiently above the end of the stem to permit elevation of the stem to the upper limit of its travel. Spring fingers 91 engage the upper surfaces of handle arms 81 and normally urge the arms downwardly against washer 84. Preferably, spring fingers 91 are preloaded in the horizontally extending position of the drawings, that is, they are normally urged downwardly below the illustrated positions and thus exert an effective downward force against the arms.

For purposes of illustration, we shall assume that hot water is supplied through passage 30 of the inlet fitting and tail pipe passage 22, and cold water is supplied through passages 31 and 23. Thus, hot water discharges outwardly from opening 40 between the lower surface 54 of valve element 50 and the outer semi-circular surface 44 of valve seat 42. Similarly, cold water discharges outwardly from opening 41 between surface 54 and the semi-circular surface 45 of seat 43.

The total rate of water discharge is controlled by vertical movement of valve assembly 12 as a unit to vary the distance between surface 54 of element 50 and the two semi-circular valve seat surfaces 44 and 45. As will be understood, the discharge temperature may be regulated independently of the rate of flow by rotation of element 51 and its fluid blocking skirt S about element 50 and the valve seat structure. In the position of Figs. 1, 2, and 4, skirt S of element 51 blocks water discharge along the rear half of each of the valve seat surfaces 44 and 45, while water is permitted to discharge past the forward portions of these surfaces. Assuming the supply pressures to be the same, such a setting results in an equal mixture of hot and cold water. Rotation of skirt S in either direction, however, alters the proportions of hot and cold water to correspondingly change the discharge temperature. Because skirt edges 62 and 63 extend vertically, movement of the valve assembly vertically does not affect the discharge temperature (ignoring frictional effects), thus permitting completely independent regulation of the total rate of flow at a given temperature.

Temperature controlling rotation of stem 13 and element 51 is effected by lateral swinging movement of handle 14 about the axis of the stem. As will be understood, thermostatic unit 65 responds to changes in temperature or pressure of the incoming water to maintain the discharge temperature substantially constant for any particular temperature setting. Vertical movement of the stem and valve assembly to vary the total rate of discharge is controlled by vertical swinging movement of handle 14 between the full line and broken line positions of Fig. 1. Such vertical swinging movement of the handle causes rotation of handle arms 81, which, being tightly retained against bodily vertical displacement, effect corresponding vertical movement of pin 71, and, through it, stem 13 and the valve assembly. The handle is maintained in any desired vertical setting by frictional engagement of its arms 81 with spring fingers 91 and washer 84. It is of course contemplated that this frictional retention may be increased by treatment of the engaging surfaces in any known friction increasing manner, as by roughening these surfaces or covering them with a material having a high coefficient of friction.

It will be noted that any wear of washer 84, the upper surface of insert 76, or the lower surfaces of arms 81 results in a change in the on and off positions of the handle. Consequently, these parts, or at least their engaging surfaces, are preferably formed of a relatively hard wear resistant material, and any friction increasing treatment that may also materially increase the susceptibility to wear is confined to the upper surfaces of the handle arms or the lower surfaces of the spring fingers. The threaded reception of insert 76 within cap 68 permits adjustment of the on and off positions of the handle either upon initial installation or after wear. If this adjustment is deemed unnecessary for any particular use, the insert may be formed integrally with the cap.

Figure 7:
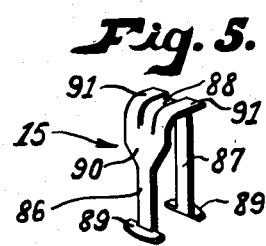
Fig. 7 is a fragmentary side elevation of a variational form of handle and spring.

Fig. 7 illustrates a slightly different form of handle and spring arrangement, in which a pair of spaced circular handle arms 81a, corresponding to arms 81 of Fig. 1, cooperate with spring fingers 91a to control the vertical position of the valve assembly. In this form, one or both of the handle arms 81a includes an arcuate bearing member or surface portion 94, received in a correspondingly dimensioned arcuate recess in the arm and retained securely to the arm, as by their inwardly extending end flanges 96. Member 94 has an upper notched surface 98, engageable with notches 99 on the under surface of the spring finger to act as a detent for maintaining the handle in any position to which it may be set. The downwardly facing portion of bearing member 94 is engageable, as at 100, with washer 84a. Preferably, member 94 and washer 84a are made of relatively hard wear resistant material, such as hardened steel, to assure maximum operating life of the device.

Figs. 8 through 10 illustrate a variational form of mixing valve, comprising a body 101, valve assembly 102 regulating discharge from the body, stem 103, control member 104 controlling vertical movement of the valve, and handle 105. The body is similar to that in the Fig. 1 form, having a tubular inlet portion or tail pipe 106 divided interiorly by partition 107 into a pair of vertically extending semi-cylindrical passages 108 and 109. Partition 107 extends upwardly within the body to carry at its upper end circular horizontal wall 111, having annular vertically extending outer surface 112 and containing an opening 113 at one side of the partition (see Figs. 9 and 10). The partition has a pair of vertical outer or side surfaces 114 extending downwardly from surface 112 and of a horizontal curvature corresponding to that of surface 112. About passages 108 and 109, the body forms an annular downwardly extending groove 115 having an inner cylindrical wall 116 of a diameter corresponding to surface 112. Along the outer edge of groove 115, body 101 forms tapered annular valve seat 118, which is considered in certain of the claims to comprise a pair of complementary semi-circular valve seat surfaces corresponding to curved surfaces 44 and 45 of the Fig. 1 form.

Valve assembly 102 includes valve element 119, preferably of slightly deformable material such as rubber or a suitable plastic, and cap 120 of a rigid material. Element 119 comprises a circular horizontal top wall 220 and cylindrical side wall 121 having a vertical cylindrical inner surface 122 of a diameter corresponding to body surface 112. Thus, valve element 119 is receivable about wall 111 and the upper end of partition 107 with inner valve surface 122 slidably engaging surfaces 112 and 114. The outer surface 123 of valve element side wall 121 is upwardly tapered and of frusto-conical configuration. Extending inwardly from the lower end of surface 123, element 119 presents an essentially downwardly facing tapered annular valve surface 124 disposed parallel to seat 118 and engageable with that seat upon downward movement of the valve to closed position. Throughout half its circular extent, an inner portion of sidewall 121 extends downwardly beyond tapered surface 124 to form depending semi-cylindrical skirt S', corresponding to skirt S of Fig. 1, and of a radial dimension slightly less than the width of groove 115 to permit its sliding reception within the groove.

Cap 120 has a frusto-conical side wall 127 engaging surface 123 of element 119, and a horizontal top wall 128 normally spaced a short distance above wall 220 (see Figs. 8 and 9). On its upper surface, wall 128 of the cap rigidly carries horizontal ring 130, which has an inner slightly tapered vertically grooved annular surface 132.

Control member 104 threadedly engages the body at 134, and has a vertically extending central bore 135 within which stem 103 is movably received. Member 104 and ring 130 have engaging annular horizontal surfaces at 136, by virtue of which downward motion of the member is transmitted to the valve assembly. At the lower end of bore 135, element 104 presents an upwardly tapered vertically grooved surface 137 disposed opposite grooved surface 132. The lower end of stem 103 carries externally vertically grooved circular enlargement 138, which is selectively movable into operative engagement with either of the two internally grooved surfaces 132 or 137.

Stem 103 extends upwardly through sealing elements 139 and bore 142 of body cap 143. Straight sided relatively narrow upper end 144 of stem 103 is received within recess 145 in handle 105 for pivotal connection to the handle by pin 146. Rotatable bracket 147 pivotally mounts the inner end of the handle through pin 148. This bracket has a vertical portion 149, received within corresponding recess 150 in the upper end of the valve stem for rotation with the stem, and presents an outwardly projecting flange 151 at its lower end slidably received within annular cap recess 152.

A pair of inlet lines (not shown) are connected to the tail pipe of the body, as in the Fig. 1 form, to supply hot and cold water to passages 108 and 109, respectively. Vertical movement of valve element 119 then controls the total rate of water discharge from the passages, while rotation of the valve varies the angular position of skirt S' to control the proportion of that total flow coming from each passage. Both of these types of movement are effected by rotation of the handle. For instance, with the handle in the full line position of Fig. 8, stem enlargement 138 engages grooved surface 132 of ring 130 to transmit rotation of the handle directly to the valve cap and valve element. On the other hand, with the handle in the dot-dash position of Fig. 8, enlargement 138 engages member 104, which, by virtue of its threaded engagement with the body at 134, effects vertical movement of the valve assembly upon rotation of the handle. Opening 113 in wall 111 of the body prevents the entrapment of either air or water above body wall 111, and permits passage of cold water upwardly into engagement with the under surface of top wall 220 of the valve to urge the valve and cap upwardly against member 104 at all times.

Upon movement of the valve downwardly to closed position, surface 124 annularly engages seat 118 to form a positive seal preventing the discharge of water from either passage. Also, upon seating of the valve, cap 120 tends to continue its downward movement a short distance, as permitted by the clearance space between walls 220 and 128, to wedge side wall 121 of the valve inwardly by virtue of the tapered configuration of the engaging cap and valve surfaces. Such wedging of the valve inwardly effects its tight engagement with body surfaces 112 and 114 and the upper portion of wall 116 to form a seal preventing interflow between the two inlet passages when the valve is closed.

Figs. 11 through 13 illustrate a further variational form of valve, comprising body 154 especially designed for use in a shower bath installation, valve assembly 155, control member 156, and handles 157 and 158. The body has a pair of inlet lines 159 and 160 containing converging passages 161 and 162, separated at their inner ends by vertical partition 163. This partition extends through circular body opening 164 into main chamber 165 to form, with cylindrical wall 166, a valve seat structure, generally indicated at 167, and corresponding essentially to the valve seat structure of the Fig. 1 form. A pair of semi-cylindrical valve seats 168 and 169, corresponding to seats 42 and 43 of the Fig. 1 form, extend about semi-circular openings 170 and 171 of the valve seat structure through which water from passages 161 and 162 is discharged into chamber 165. As illustrated, these seats may have rounded valve engaging surfaces similar to the rounded valve seats of certain conventional faucets. The valve seat structure includes also a relatively thin diametrically extending baffle or separator 172 projecting beyond the valve seats and formed as a reduced thickness extension of partition 163.

Valve assembly 155 comprises an inner essentially cylindrical valve element 173 and an outer temperature controlling element 175. Element 173 corresponds generally to element 50 of the Fig. 1 form, but has a diametrical vertically extending recess or slot 176 in its under surface of a width corresponding to narrow separator 172 and within which that separator is slidably received (see Fig. 11). Outer valve element 175 corresponds to element 51 of Fig. 1, having a depending semi-cylindrical skirt S'' slidable about the valve seat structure to control the discharge temperature. Element 175 is carried by integrally formed stem 177, which has a relatively large diameter lower portion 178 and an upper elongated reduced diameter portion 179, and which presents transverse shoulder 180 between these two portions.

Control element 156 is received about portion 179 of the stem and threadedly engages the body at 181 to be axially movable relative to the body in response to rotation. Annular gasket or washer 182 is carried about the lower end of stem portion 179 between the transverse bottom surface of member 156 and transverse shoulder 180 of the stem, to prevent water leakage outwardly along the stem. Tubular reduced external diameter portion 184 of member 156 extends upwardly through sealing element 186 and body cap 189 for rigid connection to handle 157, as by set screw 190. Smaller handle 158 is secured to the outer end of stem 177, as by screw 191.

In operation, axial movement of valve assembly 155 controls the total rate of water discharge through outlet 192. Such axial movement is effected by rotation of handle 157 to rotate member 156, and, by virtue of the threaded engagement of member 156 with the body, axially displace that member and the valve assembly. Rotation of outer valve element 175 controls the temperature of the discharged water and is effected directly by rotation of handle 158.

While I have shown certain typical and preferred embodiments of the invention, I do not wish to limit myself to the illustrated forms, but contemplate broadly the use of any variational arrangements falling within the scope of the appended claims. For example, it is noted that where the claims refer to valve means movable "transversely" of the valve seats into seating engagement therewith, I of course do not intend to be limited to movement directly perpendicularly of the valve seat surfaces, but instead contemplate movement in any direction having a component extending transversely of the surfaces, to thus distinguish over a slide valve type of closure.

I claim:

1. A device comprising a body structure containing a fluid conducting chamber, an axially and rotatably movable valve stem extending from said chamber through a wall of said body structure to project outwardly therefrom, valve means within said chamber and operable by axial and rotational movement of said stem to control both the total rate of fluid flow through a pair of fluid passing openings communicating with said chamber and the proportion of said total flow passing through each opening, a handle, means mounting said handle to said stem at the outside of the body for pivotal movement about an axis extending transversely of said stem, said mounting means rotatably interconnecting said handle and stem whereby swinging movement of said handle about the axis of said stem effects rotation of said stem, said handle having a first curved surface facing said body wall and of a changing radius relative to said transverse axis, said handle having also a second curved surface facing away from said body wall, and a spring bearing against said second curved surface of the handle to urge the handle toward said body wall and to maintain said first curved surface in engagement with a transversely extending surface at the outside of said body wall, whereby said pivotal movement of the handle effects predetermined axial displacement of the stem by virtue of the changing radius of said first handle surface.

2. A valve device comprising a body structure containing a fluid conducting chamber, an axially and rotatably movable valve stem extending from said chamber through a wall of said body structure to project outwardly therefrom, valve means within said chamber and operable by axial and rotational movement of said stem to control both the total rate of fluid flow through a pair of fluid passing openings communicating with said chamber and the proportion of said total flow passing through each opening, a handle presenting an essentially cylindrical surface, means mounting said handle to said stem at the outside of the body for pivotal movement about an axis extending transversely to said stem and extending axially of said cylindrical handle surface at an eccentric location relative thereto, said mounting means interconnecting said handle and stem for rotation together about the axis of said stem, and a leaf spring having a transverse projection engaging said body at the side of said stem and retained by such engagement against outward displacement from said body, said spring extending outwardly about said handle to engage an outwardly facing portion of said cylindrical surface and thereby urge said handle inwardly for engagement of an inwardly facing portion of said cylindrical surface with a transverse surface at the outside of said body wall, whereby said pivotal movement of the handle effects predetermined axial displacement of the stem by virtue of the eccentric mounting of the handle.

3. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, valve closure means positioned opposite said valve seat surfaces and movable toward and away from seating engagement therewith, said movement of the closure means varying the sizes of a pair of gaps between the closure means and said surfaces respectively through which fluid flows in passing between the passages and said chamber, and fluid blocking means movable selectively to positions generally opposite and in fluid blocking relation to said gaps respectively to vary the relative rates of flow through said gaps.

4. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, a valve unit positioned opposite said valve seat surfaces and movable toward and away from a position of simultaneous seating engagement therewith, said movement of the valve unit varying the sizes of a pair of gaps between the valve unit and said surfaces respectively through which fluid flows in passing between the passages and said chamber, and fluid blocking means movable selectively to positions generally opposite and in fluid blocking relation to said gaps respectively to vary the relative rates of flow through said gaps.

5. A valve device comprising a body containing a chamber and a pair of passages communicating separately with said chamber, means forming two valve seat surfaces in the body positioned across the paths of fluid flow getween said passages respectively and the chamber, each of said surfaces being positioned across the path of fluid flow between only one of the passages and the chamber, a valve unit positioned opposite said valve seat surfaces and movable toward and away from seating engagement therewith, said movement of the valve unit varying the sizes of a pair of gaps between the valve unit and said surfaces respectively through which fluid flows in passing between the passages and said chamber, and fluid blocking means movable between positions generally opposite and in fluid blocking relation to said gaps respectively to progressively vary the relative rates of flow through said gaps.

6. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, valve closure means positioned opposite said valve seat surfaces and movable toward and away from seating engagement therewith, and fluid blocking means movable selectively to fluid blocking positions near said valve seat surfaces respectively and in said paths respectively to vary the relative rates of fluid flow through said passages.

7. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, a valve unit positioned opposite said valve seat surfaces and movable toward and away from a position of simultaneous seating engagement therewith, said movement of the valve unit varying the sizes of a pair of gaps between the valve unit and said surfaces respectively through which fluid flows in passing between the passages and said chamber, and fluid blocking means movable between fluid blocking positions substantially directly adjacent said surfaces respectively and in fluid blocking relation to said gaps respectively to progressively vary the relative rates of fluid flow through said gaps.

8. A valve device comprising a body containing a chamber and a pair of passages communicating separately with said chamber through a pair of openings in its wall, means forming two valve seat surfaces in the body extending along the edges of said openings respectively substantially directly adjacent the openings and past which fluid flows in passing between said passages respectively and the chamber, a valve unit positioned opposite said valve seat surfaces and movable toward and away from seating engagement therewith, said movement of the valve unit varying the sizes of a pair of gaps between the valve unit and said surfaces respectively through which fluid flows in passing between the passages and said chamber, and fluid blocking means movable selectively to positions generally opposite and in fluid blocking relation to said gaps respectively to vary the relative rates of flow through said gaps.

9. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, valve closure means positioned opposite said valve seat surfaces and movable toward and away from seating engagement therewith, said movement of the closure means varying the sizes of a pair of gaps between the closure means and said surfaces respectively through which fluid flows in passing between the passages and said chamber, and rotary valve means rotatable between fluid blocking positions opposite said gaps respectively to progressively vary the relative rates of flow through said passages.

10. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, a valve unit positioned opposite said valve seat surfaces and movable toward and away from a position of simultaneous seating engagement therewith, said movement of the valve unit varying the sizes of a pair of gaps between the valve unit and said surfaces respectively through which fluid flows in passing between the passages and said chamber, and fluid blocking means movable selectively to positions generally opposite and in fluid blocking relation to said gaps respectively to vary the relative rates of flow through said gaps, said fluid blocking means being carried by and movable axially with said valve unit.

11. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, valve closure means positioned opposite said valve seat surfaces and movable toward and away from seating engagement therewith, and fluid blocking means movable selectively to fluid blocking positions in said paths respectively to vary the relative rates of fluid flow through said passages, said movement of the fluid blocking means being independent of said movement of the valve means toward and away from said surfaces, and a movable operating member partially at the outside of said body and operatively connected to said fluid blocking means to effect said movement thereof.

12. A valve device comprising a body containing a chamber and a pair of passages communicating separately with said chamber, means forming two valve seat surfaces in the body positioned across the paths of fluid flow between said passages respectively and the chamber, each of said surfaces being positioned across the path of fluid flow between only one of the passages and the chamber, a valve unit positioned opposite said valve seat surfaces and movable toward and away from seating engagement therewith, said movement of the valve unit varying the sizes of a pair of gaps between the valve unit and said surfaces respectively through which fluid flows in passing between the passages and said chamber, and fluid blocking means movable relative to said valve unit between positions in fluid blocking relation to said gaps respectively to vary the relative rates of flow therethrough and through said passages.

13. A valve comprising a body containing a chamber and a pair of passages communicating with the chamber through a pair of side by side openings in a wall thereof, means forming a pair of valve seat surfaces in the body at the outer sides of said openings respectively and past each of which fluid flows in passing between the associated passage and said chamber, a valve unit movable transversely of said surfaces toward and away from a position of simultaneous seating engagement therewith, said movement of the valve unit varying the sizes of a pair of gaps between the valve unit and said surfaces respectively through which fluid flows in passing between the passages and said chamber, and fluid blocking means movable selectively to positions of fluid blocking relation to said gaps respectively to vary the relative rates of flow through said gaps and passages.

14. A valve comprising a body containing a chamber and a pair of passages communicating with the chamber through a pair of side by side openings in a wall thereof, means forming a pair of valve seat surfaces in the body at the outer sides of said openings respectively and past each of which fluid flows in passing between the associated passage and said chamber, a valve unit movable transversely of said surfaces toward and away from a position of simultaneous seating engagement therewith, said movement of the valve unit varying the sizes of a pair of gaps between the valve unit and said surfaces respectively through which fluid flows in passing between the passages and said chamber, baffle means extending between the valve unit and body at a location between said opening to prevent direct cross flow at said location so that substantially the entire flow between each passage and the chamber is directed past the corresponding one of said surfaces, and fluid blocking means movable selectively to positions of fluid blocking relation to said gaps respectively to vary the relative rates of flow through said gaps and passages.

15. A valve comprising a body containing a chamber and a pair of passages communicating with the chamber through a pair of side by side openings in a wall thereof, means forming a pair of valve seat surfaces each extending entirely about only one of said openings and each having an outer portion past which fluid flows in passing between the associated passage and said chamber, a valve unit movable transversely of said surfaces toward and away from a position of simultaneous seating engagement therewith, said movement of the valve unit varying the sizes of a pair of gaps between the valve unit and said outer portions of the valve seat surfaces respectively through which fluid flows in passing between the passages and said chamber, a baffle extending between the valve unit and body at a location between said openings to prevent direct cross flow at said location so that substantially the entire flow between each passage and the chamber is directed past the corresponding one of said surfaces, and fluid blocking means movable selectively to positions opposite and in fluid blocking relation to said gaps respectively to vary the relative rates of flow through said gaps and passages.

16. A valve comprising a body containing a chamber and a pair of passages communicating with the chamber through a pair of side by side openings in a wall thereof, means forming a pair of valve seat surfaces in the body at the outer sides of said openings respectively and past each of which fluid flows in passing between the associated passage and said chamber, a valve unit movable transversely of said surfaces toward and away from a position of simultaneous seating engagement therewith, said movement of the valve unit varying the sizes of a pair of gaps between the valve unit and said surfaces respectively through which fluid flows in passing between the passages and said chamber, and a partial cylindrical valve element movable between positions opposite and in fluid blocking relation to said gaps respectively to progressively vary the relative rates of flow through said gaps and passages.

17. A valve device comprising a chamber, a valve seat structure having a cylindrical side surface and containing a pair of fluid conducting passages communicating with the chamber through a pair of side by side openings at an end of said structure, a pair of valve seats at said end of the structure and extending about the outer sides of said openings respectively, a valve unit movable axially of said cylindrical surface of the structure toward and away from seating engagement with said valve seats, said movement of the valve unit varying the sizes of a pair of gaps between the valve unit and said surfaces respectively through which fluid flows in passing between the passages and said chamber, and a partial cylindrical valve element engaging said valve unit and said cylindrical surface of the valve seat structure and rotatable between positions of fluid blocking relation to said gaps respectively to vary progressively the relative rates of flow therethrough.

18. A valve comprising a body containing a chamber and a pair of passages communicating with the chamber through a pair of side by side openings in a wall thereof, means forming a pair of valve seat surfaces in the body at the outer sides of said openings respectively and past each of which fluid flows in passing between the associated passage and said chamber, a member mounted opposite said openings for movement along an axis toward and away from the openings and for rotation about said axis, a circular valve unit rotatably received within a circular recess in said member and movable axially therewith toward and away from a position of simultaneous seating engagement with said surfaces, said movement of the valve unit varying the sizes of a pair of gaps between the valve unit and said surfaces respectively through which fluid flows in passing between the passages and said chamber, a baffle extending between said body and valve unit at a location between said openings and acting to prevent cross flow at that location, and a partial cylindrical valve element carried by said member and rotatable therewith between positions opposite and in fluid blocking relation to said gaps respectively to progressively vary the relative rates of fluid flow through said passages.

19. A valve device comprising a body containing a chamber and a pair of passages communicating separately with said chamber through a pair of openings, two valve seats each extending entirely about only one of said openings and past which fluid flows in passing between said passages respectively and the chamber, valve closure means positioned opposite said valve seats and movable toward and away from seating engagement therewith, said movement of the closure means varying the sizes of a pair of gaps between the closure means and said surfaces respectively through which fluid flows in passing between the passages and said chamber, and fluid blocking means movable selectively to positions generally opposite and in fluid blocking relation to said gaps respectively to vary the relative rates of flow therethrough.

20. A valve device including a valve seat section containing a pair of passages communicating with a chamber through a pair of essentially semi-circular side by side openings at a side of the valve seat section, a pair of valve seats each extending entirely about only one of said openings, said seats having outer substantially semi-circular and complementary portions and having inner diametrical portions, a circular valve closure section positioned opposite said valve seats and movable toward and away from a position of simultaneous seating engagement therewith, said movement of the valve closure section varying the sizes of a pair of fluid passing gaps between the outer semi-circular portions of said seats and the valve closure section through which fluid flows from said passages respectively and into the chamber, a diametrical baffle extending between said sections at a location between the inner diametrical portions of said seats and acting to prevent substantial cross flow at that location so that substantially the entire fluid flow from each passage is directed outwardly through the corresponding one of said gaps, and a semi-cylindrical valve element rotatable between positions opposite and in fluid blocking relation to said gaps respectively to progressively vary the relative rates of flow through the gaps.

21. A flow control unit comprising a body section containing a chamber and a pair of passages communicating with the chamber through a pair of side by side openings in a wall thereof, means forming a pair of valve seat surfaces in the body at the outer sides of said openings respectively and past each of which fluid flows in passing between the associated passage and said chamber, a valve section movable transversely of said surfaces toward and away from a position of simultaneous seating engagement therewith, said movement of the valve section varying the sizes of a pair of gaps between the valve section and said surfaces respectively through which fluid flows in passing between the passages and said chamber, a baffle extending between said sections at a location between said openings and acting to prevent substantial cross flow at said location so that substantially the entire flow between each passage and the chamber is directed past the corresponding one of said surfaces, said baffle being carried by one of said sections and receivable within a recess in the other section as the valve section moves toward said surfaces, and fluid blocking means movable selectively to positions opposite and in fluid blocking relation to said gaps respectively to vary the relative rates of flow through said gaps and passages.

22. A valve comprising a body containing a chamber and a pair of passages communicating with the chamber through a pair of side by side openings in a wall thereof, means forming a pair of valve seat surfaces in the body at the outer sides of said openings respectively and past each of which fluid flows in passing between the associated passage and said chamber, valve means movable along an axis and transversely of said surfaces toward and away from a position of simultaneous seating engagement therewith, said movement of the valve means varying the sizes of a pair of gaps between the valve means and said surfaces respectively through which fluid flows in passing between the passages and said chamber, baffle means extending between the valve means and body at a location between said openings and acting to prevent substantial cross flow at said location so that substantially the entire flow between each passage and the chamber is directed past the corresponding one of said surfaces, and a partial cylindrical valve element movable along said axis with said valve means and rotatable relative thereto about said axis between positions opposite and in fluid blocking relation to said gaps respectively to vary the relative rates of flow through said gaps and passages.

23. A valve device comprising a body containing a chamber, a valve seat section in the chamber having a cylindrical side surface and containing a pair of fluid conducting passages communicating with the chamber through a pair of essentially semi-circular side by side openings at an end of said section, a pair of valve seats at said end of the section each extending entirely about only one of said openings, said seats having outer substantially semi-circular and complementary portions and having inner essentially diametrical portions, a member mounted opposite said openings movable axially of said cylindrical surface and rotatable about said axis, said member containing a circular recess facing said valve seat section and of a diameter corresponding to said cylindrical surface, a circular valve section carried and rotatable within said recess and movable axially with said member toward and away from a position of simultaneous seating engagement with said surfaces, said movement of the valve section varying the sizes of a pair of gaps between the valve section and said surfaces respectively through which fluid flows in passing between the passages and said chamber, and a baffle extending between said valve and valve seat sections and diametrically substantially entirely thereacross at a location between said inner portions of said valve seats and acting to prevent cross flow at said locations, said baffle being carried by one of said sections and receivable within a diametrical recess in the other section as the valve section is moved toward said valve seats, said member having a substantially semi-cylindrical skirt portion of an internal diameter corresponding to and engaging said cylindrical surface of the valve seat section and rotatable with said member between positions opposite and in fluid blocking relation to said gaps respectively to vary the relative rates of flow through said gaps and passages.

24. A valve device comprising a body containing a chamber, a structure projecting into said chamber containing two isolated fluid passages and having a pair of lateral openings at different locations about said structure through which said passages communicate separately with the chamber, and a cup-like valve element received about an inner end of said structure having an essentially cylindrical side wall extending about the structure and having an essentially transverse end wall inwardly beyond said end of the structure, said valve element being movable along the axis of said side wall relative to said structure between a first position in which said side wall closes said structure openings and a second position exposing said openings for fluid flow therethrough, whereby axial movement of the valve element progressively varies the exposed areas of said openings and thereby the total fluid flow between the chamber and said passages, said valve element being rotatable about said axis relative to said structure, and a partial cylindrical skirt extending from said side wall of the valve element in a direction away from said end wall thereof and rotatable with the element about said structure between positions of fluid blocking relation to portions of said openings beyond said side wall to thereby vary the proportion of said total flow passing through said passages respectively.

25. A valve device as recited in claim 24, including a valve seat on the body facing into said chamber and extending about said structure and skirt, and in which said side wall of the valve element has an essentially annular portion radially outwardly of said skirt movable into seating engagement with said seat to form a positive fluid seal between the passages and said chamber upon axial movement of the valve element in the direction for closing said openings.

26. A valve device as recited in claim 25, in which said side wall of the valve element is flexible and has an outer surface tapering toward said end wall, and in which the device includes a cup-like element received about and more rigid than said valve element and through which force is transmitted to the valve element for moving said annular portion thereof into engagement with said seat, said cup-like element having a side wall with an inner surface engaging and tapering essentially in correspondence to said outer surface of the valve element side wall and acting to wedge said side wall of the valve element into tight sealing engagement with said structure as the valve element engages said seat.

WILLIAM P. GREEN.

References Cited in the file of this patent

UNITED STATES PATENTS

| Number | Name | Date |
| --- | --- | --- |
| 742,327 | Huye | Oct. 27, 1903 |
| 998,496 | Godleskie | July 18, 1911 |
| 1,095,003 | Leonard | Apr. 28, 1919 |
| 1,783,264 | Sirotek | Dec. 2, 1930 |
| 1,807,081 | Bletcher | May 26, 1931 |
| 1,882,953 | Saelezer | Oct. 18, 1932 |
| 2,158,342 | Trader | May 16, 1939 |
| 2,308,127 | Symmons | Jan. 12, 1943 |

FOREIGN PATENTS

| Number | Country | Date |
| --- | --- | --- |
| 750,709 | France | of 1933 |